US012671307B2

(12) United States Patent
Chen et al.

(10) Patent No.: US 12,671,307 B2
(45) Date of Patent: Jun. 30, 2026

(54) CONTROLLER AND METHOD FOR CONTROLLING A VOLTAGE CONVERTER

(71) Applicant: Beijing Big Moment Technology Co., Ltd, Beijing (CN)

(72) Inventors: Kai Chen, Beijing (CN); Zhiguo Liu, Beijing (CN); Bo Wei, Beijing (CN); Xiaofei Yang, Beijing (CN); Yanlin Xia, Beijing (CN); Yue Wang, Beijing (CN); Mingqiang Chen, Beijing (CN)

(73) Assignee: Beijing Big Moment Technology Co., Ltd., Beijing (CN)

( * ) Notice: Subject to any disclaimer, the term of this patent is extended or adjusted under 35 U.S.C. 154(b) by 202 days.

(21) Appl. No.: 18/510,416

(22) Filed: Nov. 15, 2023

(65) Prior Publication Data

US 2024/0162801 A1     May 16, 2024

(30) Foreign Application Priority Data

Nov. 15, 2022     (CN) .......................... 202211423744.5

(51) Int. Cl.
*H02M 3/157* (2006.01)
*H02M 1/00* (2006.01)

(52) U.S. Cl.
CPC ....... *H02M 1/0022* (2021.05); *H02M 1/0025* (2021.05); *H02M 3/157* (2013.01)

(58) Field of Classification Search
CPC ......... H02M 3/33538; H02M 3/33546; H02M 3/33515; H02M 3/33576; H02M 3/33553; H02M 3/33507; H02M 3/33592; H02M 3/33523; H02M 3/3353; H02M 3/33569
See application file for complete search history.

(56) References Cited

U.S. PATENT DOCUMENTS

2022/0181867 A1* 6/2022 Cao ........................... H02H 9/02

* cited by examiner

*Primary Examiner* — Bryan R Perez

(57) ABSTRACT

A controller for controlling a voltage converter includes a compensation circuit, an acceleration circuit and a driving circuit. The voltage converter generates a real-time charging current, a real-time battery voltage and a system voltage. The compensation circuit compares the real-time charging current with a preset charging current to generate a first comparison result, compares the real-time battery voltage with a preset battery voltage to generate a second comparison result, compares the system voltage with a preset reference voltage to generate a third comparison result, and generates a compensation voltage based on the first, second and third comparison results. The acceleration circuit adjusts the compensation voltage based on a state of charge of the battery and the system voltage. The driving circuit generates a first switching signal and a second switching signal based on the compensation voltage to control an upper switch and a lower switch of the voltage converter, respectively.

11 Claims, 7 Drawing Sheets

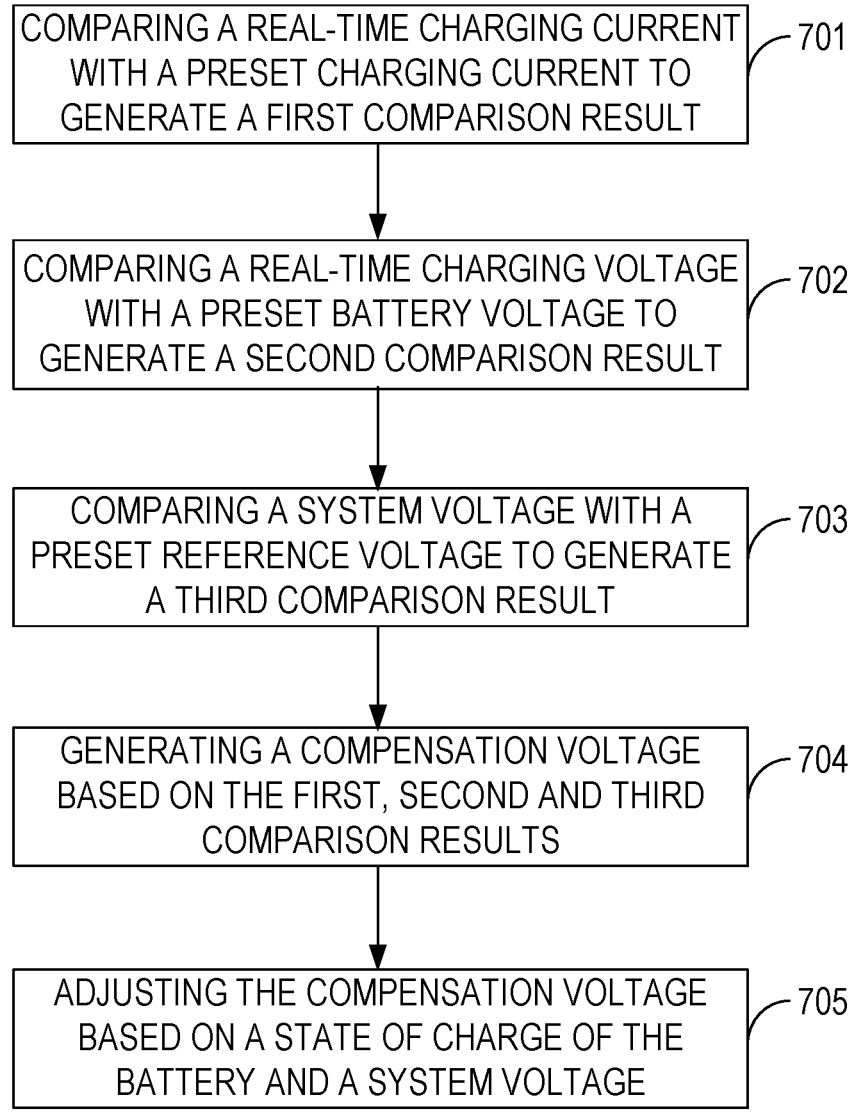

COMPARING A REAL-TIME CHARGING CURRENT WITH A PRESET CHARGING CURRENT TO GENERATE A FIRST COMPARISON RESULT — 701

COMPARING A REAL-TIME CHARGING VOLTAGE WITH A PRESET BATTERY VOLTAGE TO GENERATE A SECOND COMPARISON RESULT — 702

COMPARING A SYSTEM VOLTAGE WITH A PRESET REFERENCE VOLTAGE TO GENERATE A THIRD COMPARISON RESULT — 703

GENERATING A COMPENSATION VOLTAGE BASED ON THE FIRST, SECOND AND THIRD COMPARISON RESULTS — 704

ADJUSTING THE COMPENSATION VOLTAGE BASED ON A STATE OF CHARGE OF THE BATTERY AND A SYSTEM VOLTAGE — 705

CONTROLLER AND METHOD FOR CONTROLLING A VOLTAGE CONVERTER

RELATED APPLICATION

This application claims priority to Chinese Patent Application No. 202211423744.5, titled "Controller and Method for Controlling a Voltage Converter," filed on Nov. 15, 2022, with the National Intellectual Property Administration of the People's Republic of China (CNIPA).

BACKGROUND

FIG. 1 shows a conventional power supply circuit 100, including a controller 110 and a voltage converter 120. The voltage converter 120 includes an upper switch Q1, a lower switch Q2, an inductor L1, and a capacitor C1. The power supply circuit 100 receives electrical power from an adapter 102 and supplies power to the load 180 (e.g., an electronic device) and charges the battery 160. When the battery 160 is fully charged, the controller 110 turns off a switch Q3 coupled between the voltage converter 120 and the battery 160 to stop charging the battery 160, and the adapter 102 supplies power to the load 180 through the voltage converter 120. The switch Q3 is implemented by a Metal Oxide Semiconductor Field Effect Transistor (MOSFET). According to different power requirements of the load 180, the voltage converter 120 can operate in a discontinuous conduction mode or a continuous conduction mode. The controller 110 generates a pulse width modulation signal internally, and generates signals HDR and LDR based on this pulse width modulation signal to control the upper switch Q1 and lower switch Q2 of the voltage converter 120, respectively. By adjusting the duty cycle of the pulse width modulation signal, the controller 110 can adjust the electrical power output by the voltage converter 120 and control the operation mode of the voltage converter 120.

In operation, if the current of the load 180 increases to a certain threshold value, the controller 110 needs to switch the operation mode of the voltage converter 120 from the discontinuous conduction mode to the continuous conduction mode. When the current of load 180 suddenly changes (e.g., increasing suddenly), causing the operation mode of the voltage converter 120 switched from the discontinuous conduction mode to the continuous conduction mode. As the loop response speed of the conventional power supply circuit 100 is relatively slow, before the mode switching is completed, the voltage VSYS output by the voltage converter 120 to the load 180 will decrease. If battery 160 is fully charged and the voltage VSYS is less than the voltage of battery 160, and if the difference between the two is greater than the forward conduction voltage of the switch Q3's body diode (usually around 0.5V), the battery 160 will discharge through Q3's body diode and supplies power to the load 180. The discharging of the battery 160 will not stop until the voltage converter 120 completes the mode switching and the adapter 102 provides all the electrical power required by the load 180. In operation of the circuit, the power demand of the load 180 is dynamically changing, and the operation mode of the voltage converter 120 frequently switches from one to the other. This will cause frequent discharging of the battery 160, such that the battery 160 always cannot be fully charged.

SUMMARY

Disclosed are embodiments of a controller for controlling a voltage converter. The voltage controller receives electrical power from an adapter, generates a real-time charging current and a real-time battery voltage to charge a battery, and generates a system voltage to power a load. The controller includes a compensation circuit, an acceleration circuit and a driving circuit. The compensation circuit is operable for comparing the real-time charging current with a preset charging current to generate a first comparison result, comparing the real-time battery voltage with a preset battery voltage to generate a second comparison result, comparing the system voltage with a preset reference voltage to generate a third comparison result, and generating a compensation voltage based on the first comparison result, the second comparison result, and the third comparison result. The acceleration circuit is operable for adjusting the compensation voltage based on a state of charge of the battery and the system voltage. The driving circuit is operable for generating a first switching signal and a second switching signal based on the compensation voltage to control an upper switch and a lower switch of the voltage converter, respectively.

In other embodiments, a method for controlling a voltage converter is disclosed. The voltage controller voltage converter receives electrical power from an adapter, generates a real-time charging current and a real-time battery voltage to charge a battery, and generates a system voltage to power a load. The method includes: comparing the real-time charging current with a preset charging current to generate a first comparison result; comparing the real-time battery voltage with a preset battery voltage to generate a second comparison result; comparing the system voltage with a preset reference voltage to generate a third comparison result; generating a compensation voltage based on the first comparison result, the second comparison result and the third comparison result; adjusting the compensation voltage based on a state of charge of the battery and the system voltage; and generating a first switching signal and a second switching signal based on the compensation voltage to control an upper switch and a lower switch of the voltage converter, respectively.

BRIEF DESCRIPTION OF THE DRAWINGS

Features and advantages of embodiments of the claimed subject matter will become apparent as the following detailed description proceeds, and upon reference to the drawings, wherein like numerals depict like parts, and in which:

FIG. 7 shows a flowchart of a method for controlling a voltage converter, in accordance with embodiments of the present invention.

DETAILED DESCRIPTION

Reference will now be made in detail to the embodiments of the present invention. While the invention will be described in combination with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail to avoid obscuring aspects of the present invention.

Figure 1:
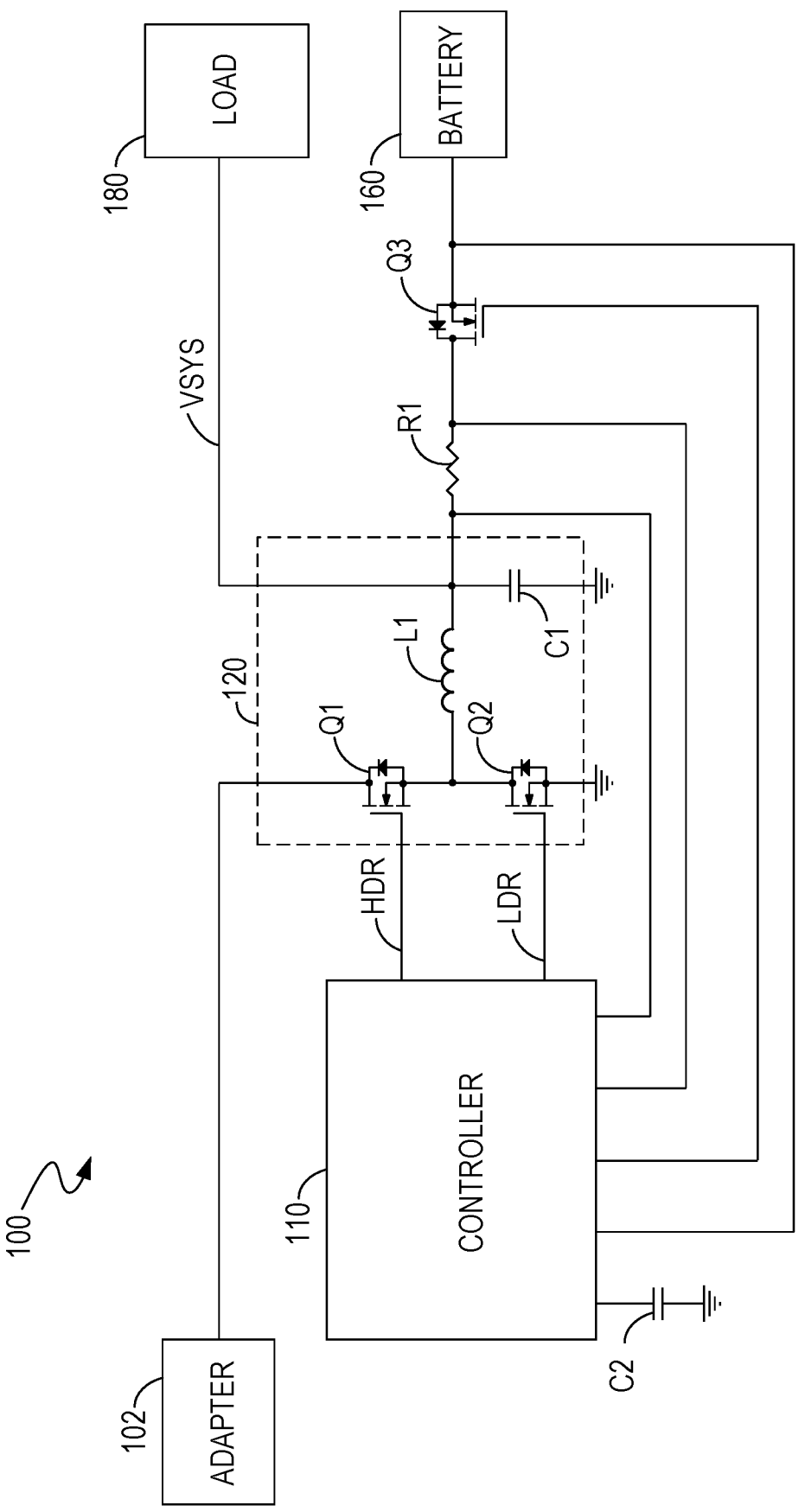
FIG. 1 shows a conventional power supply circuit.
Figure 2:
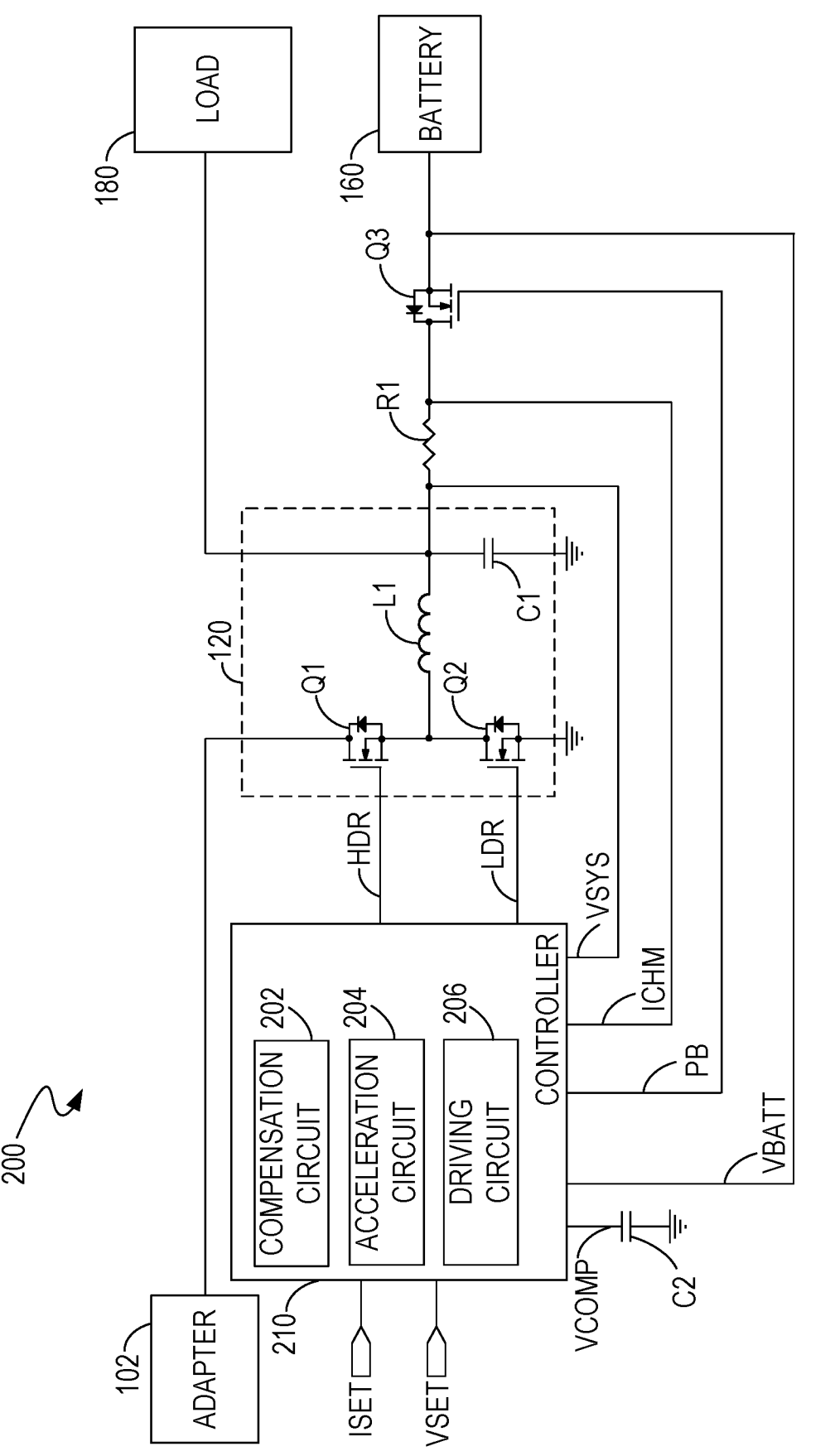
FIG. 2 shows a power supply circuit, in accordance with embodiments of the present invention

FIG. 2 shows a power supply circuit 200 that supplies power to a load 180 and a battery 160, in accordance with embodiments of the present invention. The power supply circuit 200 includes a voltage converter 120 and a controller 210 for controlling the voltage converter 120. The voltage converter 120 receives electrical power from an adapter 102 and generates a real-time charging current and a real-time battery voltage VBATT to charge the battery 160. The voltage converter 120 also generates a system voltage VSYS to power a load 180.

The controller 210 receives a preset charging current ISET and a preset battery voltage VSET, and outputs a first switching signal HDR and a second switching signal LDR to control a upper switch Q1 and a lower switch Q2 of the voltage converter 120, respectively. The controller 210 also outputs a signal PB to control the a Q3 coupled between the voltage converter 120 and the battery 160. The controller 210 includes a compensation circuit 202, an acceleration circuit 204, and a driving circuit 206. The compensation circuit 202 compares the real-time charging current with the preset charging current ISET to generate a first comparison result, compares the real-time battery voltage VBATT with the preset battery voltage VSET to generate a second comparison result, compares the system voltage VSYS with a preset reference voltage VREF to generate a third comparison result, and generates a compensation voltage VCOMP based on the first comparison result, the second comparison result and the third comparison result. In one embodiment, the preset reference voltage VREF is generated internally in the controller 210. The acceleration circuit 204 adjusts the compensation voltage VCOMP based on a state of charge of the battery 160 and the system voltage VSYS. The driving circuit 206 generates the first switching signal HDR and the second switching signal LDR based on the compensation voltage VCOMP to control the upper switch Q1 and lower switch Q2 of the voltage converter 120, respectively. As shown in FIG. 2, the controller 210 detects the real-time charging current by a resistor R1. Specifically, controller 210 receives a voltage signal VSYS from one end of the resistor R1 and a voltage signal ICHM from the other end of the resistor R1. The voltage signal VSYS is the system voltage supplied to the load 180. The difference between the voltage signal VSYS and the voltage signal ICHM can indicate the real-time charging current of battery 160.

Figure 3:
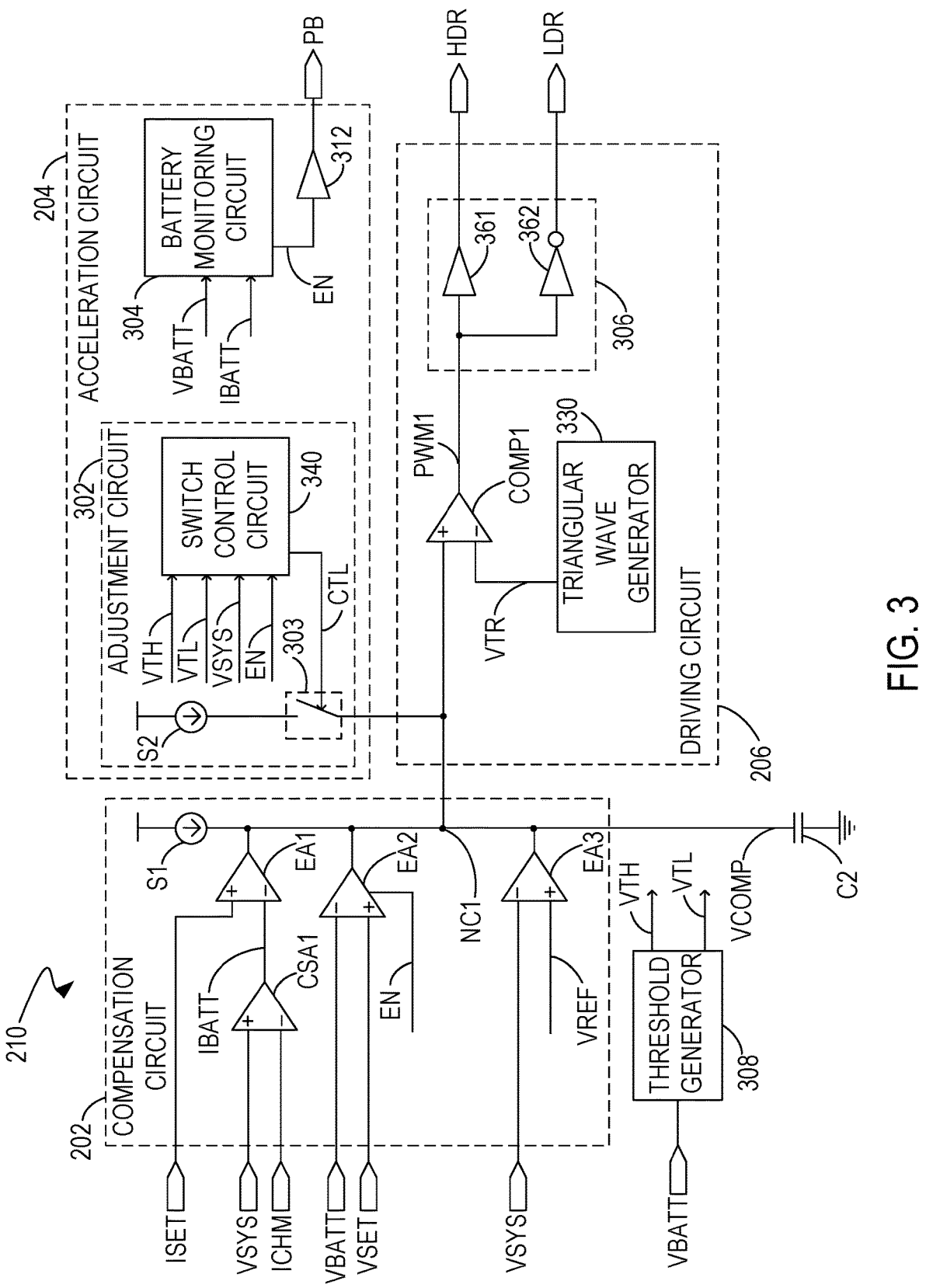
FIG. 3 shows a circuit diagram of a controller, in accordance with embodiments of the present invention.

FIG. 3 shows a circuit diagram of a controller 210, in accordance with embodiments of the present invention. The controller 210 includes a compensation circuit 202, an acceleration circuit 204 and a driving circuit 206. The compensation circuit 202 includes a first operational amplifier EA1, a second operational amplifier EA2, a third operational amplifier EA3 and a fourth operational amplifier CSA1. The fourth operational amplifier CSA1 compares the voltage signal VSYS and the voltage signal ICHM from two ends of the resistor R1 to generates a current indication signal IBATT representing the real-time charging current. The first operational amplifier EA1 compares the current indication signal IBATT with the preset charging current ISET to generate the first comparison result. The second operational amplifier EA2 compares the real-time battery voltage VBATT with the preset battery voltage VSET to generate the second comparison result. The third operational amplifier EA3 compares the system voltage VSYS with the preset reference voltage VREF to generate the third comparison result. The compensation circuit 202 also includes a current source S1 for charging a capacitor C2. The voltage across the capacitor C2 is the compensation voltage VCOMP, which is adjusted by the first, second and third comparison results. Specifically, if the real-time charging current represented by the current indication signal IBATT is less than the preset charging current ISET, then the output of the first operational amplifier EA1 increases, and the current provided by the current source S1 charges the capacitor C2. As a result, the compensation voltage VCOMP increases. If the real-time charging current represented by the current indication signal IBATT is greater than the preset charging current ISET, then the output of the first operational amplifier EA1 decreases, and the first operational amplifier EA1 absorbs the current provided by the current source S1. As a result, the compensation voltage VCOMP decreases. If the real-time battery voltage VBATT is less than the preset battery voltage VSET, then the output of the second operational amplifier EA2 increases, and the current provided by current source S1 charges the capacitor C2. As a result, the compensation voltage VCOMP increases. If the real-time battery voltage VBATT is greater than the preset battery voltage VSET, then the output of the second operational amplifier EA2 decreases, and the second operational amplifier EA2 absorbs the current provided by the current source S1. As a result, the compensation voltage VCOMP decreases. If the system voltage VSYS is less than the preset reference voltage VREF, then the output of the third operational amplifier EA3 increases, and the current provided by current source S1 charges capacitor C2. As a result, the compensation voltage VCOMP increases. If the system voltage VSYS is greater than the preset reference voltage VREF, then the output of the third operational amplifier EA3 decreases, and the third operational amplifier EA3 absorbs the current provided by the current source S1. As a result, the compensation voltage VCOMP decreases.

The driving circuit 206 includes a triangular wave generator 330, a first comparator COMP1 and a driver 306. The triangular wave generator 330 is operable for generating a triangular wave signal VTR. The first comparator COMP1 generates a pulse width modulation signal PWM1 based on the triangular wave signal VTR and the compensation voltage VCOMP. Specifically, a first input terminal of the first comparator COMP1 receives the compensation voltage VCOMP, a second input terminal of the first comparator COMP1 receives the triangular wave signal VTR, and the output terminal of the first comparator COMP1 outputs the pulse width modulation signal PWM1. The first input terminal of the first comparator COMP1, the output terminal of the first operational amplifier EA1, the output terminal of the second operational amplifier EA2, the output terminal of the third operational amplifier EA3, the current source S1 and the capacitor C2 are connected to a common node NC1. The driver 306 generates the first switching signal HDR and the second switching signal LDR based on the pulse width modulation signal PWM1. In one embodiment, the driver 306 includes a buffer 361 and an inverter 362.

Figure 4:
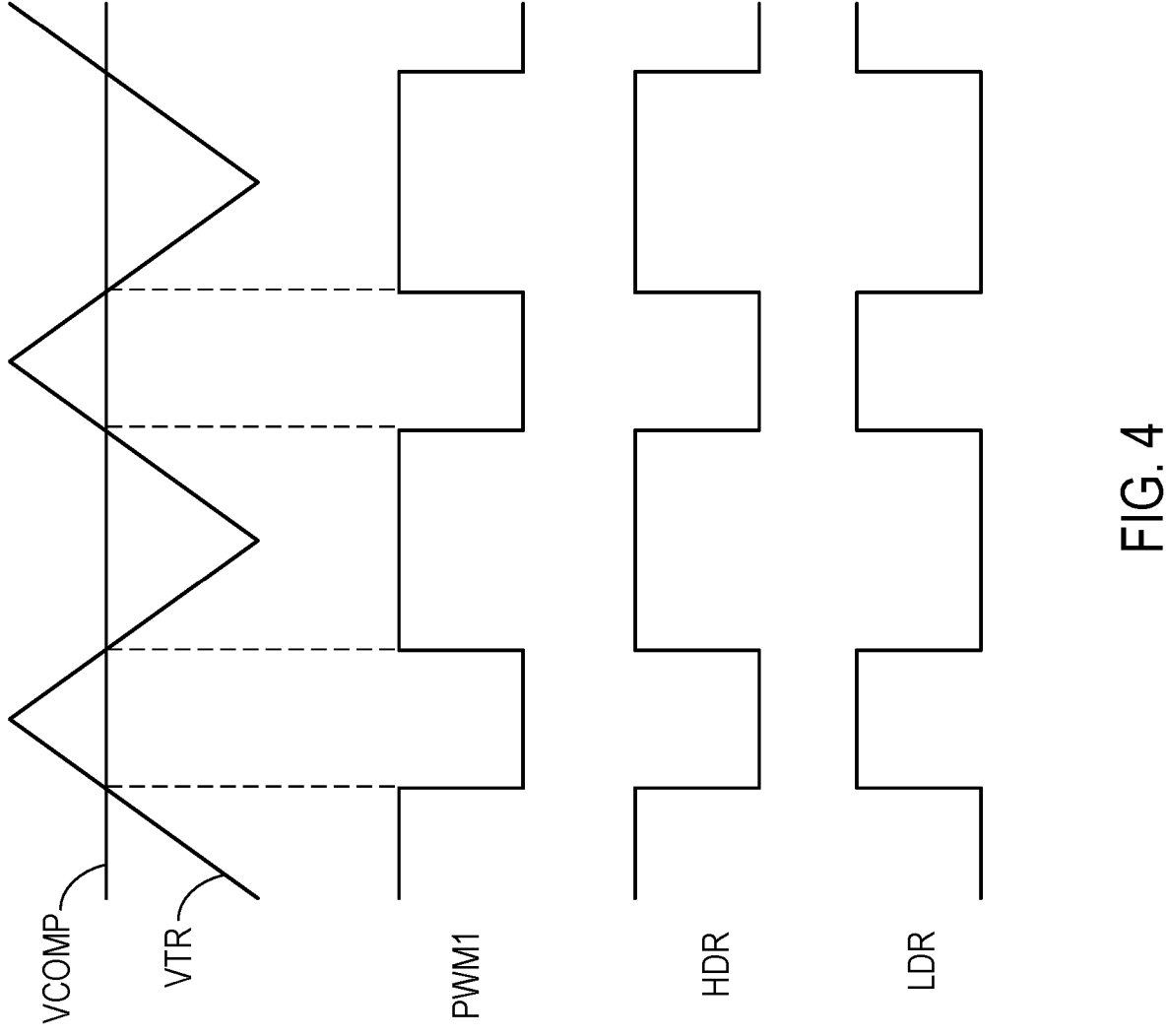
FIG. 4 shows signal waveforms of a controller, in accordance with embodiments of the present invention.

As shown in FIG. 4, if the compensation voltage VCOMP is greater than the triangular wave signal VTR, the pulse width modulation signal PWM1 is logic high. If the compensation voltage VCOMP is less than the triangular wave signal VTR, the pulse width modulation signal PWM1 is logic low. The first switching signal HDR generated by the driver 306 is in phase with the pulse width modulation signal PWM1, and the second switching signal LDR is inverted with the pulse width modulation signal PWM1. When the voltage converter 120 supplies power to the load 180, if the compensation voltage VCOMP increases, then the duty cycle of pulse width modulation signal PWM1 increases accordingly, and the system voltage VSYS provided to the load 180 by the voltage converter 120 also increases accordingly.

The acceleration circuit 204 includes a battery monitoring circuit 304 and an adjustment circuit 302. The battery monitoring circuit 304 generates a charge indication signal EN indicating a state of charge of the battery 160 based on the real-time battery voltage VBATT and the real-time charging current indicated by the current indication signal IBATT. The adjustment circuit 302 adjusts the compensation voltage VCOMP based on the charge indication signal EN and the system voltage VSYS. Specifically, if the charge indication signal EN indicates that the battery 160 is in a fully charged state and the system voltage VSYS decreases to the first threshold VTL, the adjustment circuit 302 increases the compensation voltage VCOMP; if the charge indication signal EN indicates that the battery 160 is in a fully charged state and the system voltage VSYS increases to the second threshold VTH, the adjustment circuit 302 stops increasing the compensation voltage VCOMP. In one embodiment, as shown in FIG. 3, the controller 210 further includes a threshold generator 308 for generating the first threshold VTL and the second threshold VTH based on the real-time battery voltage VBATT, wherein the first threshold VTL is less than the second threshold VTH. In one embodiment, the threshold generator 308 receives the real-time battery voltage VBATT and shifts the voltage of the real-time battery voltage VBATT to generate the first threshold VTL and the second threshold VTH. For example, the first threshold VTL is configured to be VBATT minus a first constant (e.g., VBATT minus 0.1V), and the second threshold VTH is configured to be VBATT plus a second constant (e.g., VBATT plus 0.2V). The first constant is less than the forward conduction voltage of the switch Q3's body diode. In one embodiment, the preset reference voltage VREF is configured to be equal to the second threshold VTH.

As shown in FIG. 3, the adjustment circuit 302 includes a switch unit 303 coupled between a current source S2 and the capacitor C2, and a switch control circuit 340 coupled to the switch unit 303. If the charge indication signal EN indicates that the battery 160 is in a fully charged state and the system voltage VSYS decreases to the first threshold VTL, the switch control circuit 340 turns on the switch unit 303 to charge the capacitor C2 by the current source S2 to increase the compensation voltage VCOMP. If the system voltage VSYS increases to the second threshold VTH, the switch control circuit 340 turns off the switch unit 303 to stop increasing the compensation voltage VCOMP.

Figure 5:
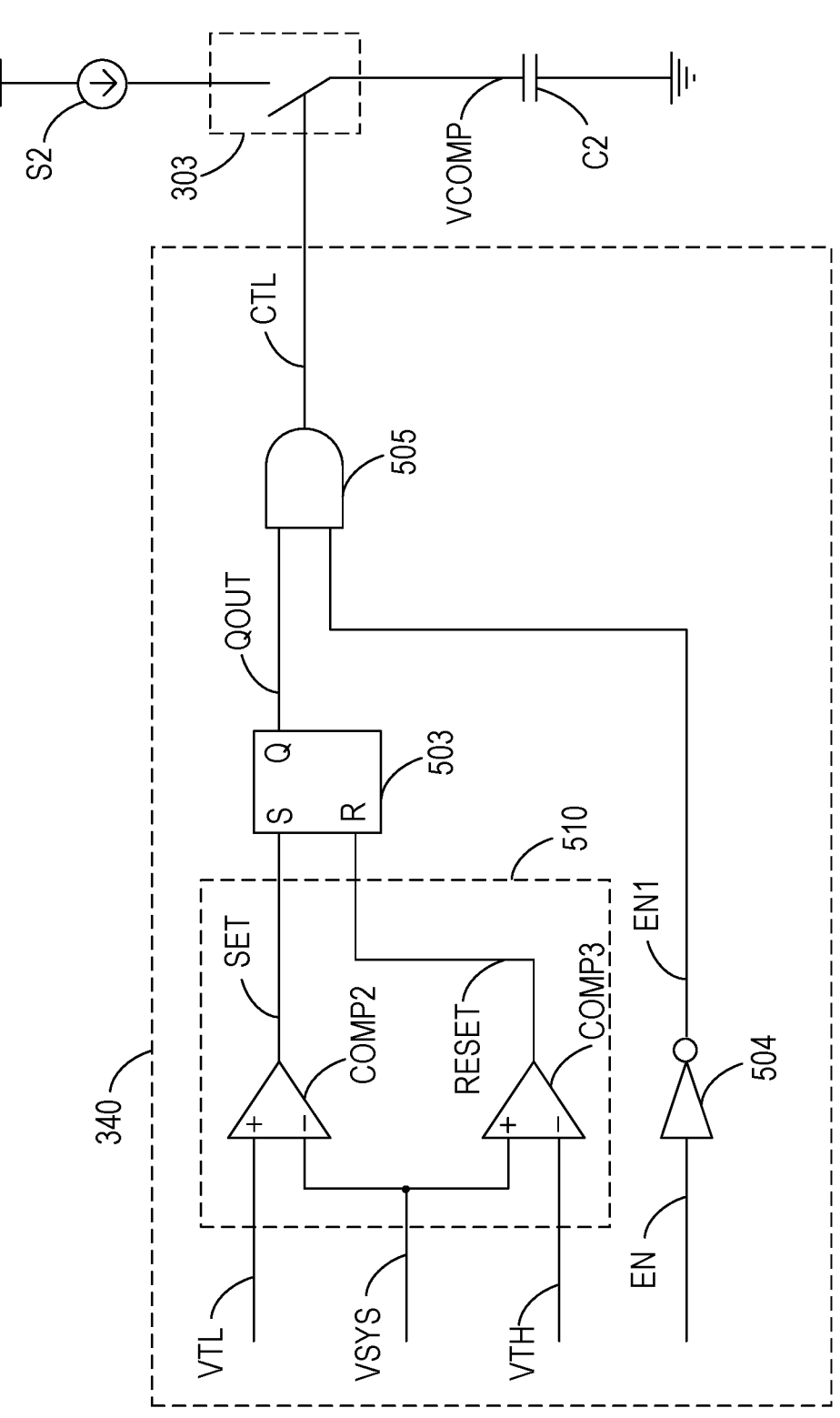
FIG. 5 shows a circuit diagram of a switch control circuit in a controller, in accordance with embodiments of the present invention.

FIG. 5 shows the circuit diagram of the switch control circuit 340 in the controller 210, in accordance with embodiments of the present invention. The switch control circuit 340 includes a system voltage monitoring unit 510, an R-S flip-flop 503, and an AND gate 505. The system voltage monitoring unit 510 generates a first control signal SET and a second control signal RESET based on the system voltage VSYS. The R-S flip-flop 503 generates a status signal QOUT based on the first control signal SET and the second control signal RESET. The AND gate 505 generates a switching signal CTL based on the status signal QOUT and the charge indication signal EN to control the switch unit 303. Specifically, the system voltage monitoring unit 510 includes a second comparator COMP2 and a third comparator COMP3. The second comparator COMP2 generates the first control signal SET based on the first threshold VTL and the system voltage VSYS. The third comparator COMP3 generates the second control RESET signal based on the second threshold VTH and the system voltage VSYS. The S input terminal of the R-S flip-flop 503 receives the first control signal SET, the R input terminal of the R-S flip-flop 503 receives the second control signal RESET, and the Q output terminal of the R-S flip-flop 503 outputs the status signal QOUT. The inverter 504 inverts the charge indication signal EN to generate a signal EN1. The AND gate 505 receives the status signal QOUT and the signal EN1, and outputs the switching signal CTL.

Referring to FIGS. 2, 3, and 5, during the operation of the power supply circuit 200, the battery monitoring circuit 304 determines whether the battery 160 is in a fully charged state based on the real-time battery voltage VBATT and the real-time charging current indicated by the current indication signal IBATT, and generates the charge indication signal EN. The charge indication signal EN is provided to the second operational amplifier EA2 (shown in FIG. 3) and the switch control circuit 340 (shown in FIGS. 3 and 5), and is also provided to the buffer 312 (shown in FIG. 3) to generated the signal PB for controlling the switch Q3 (shown in FIG. 2).

Figure 6:
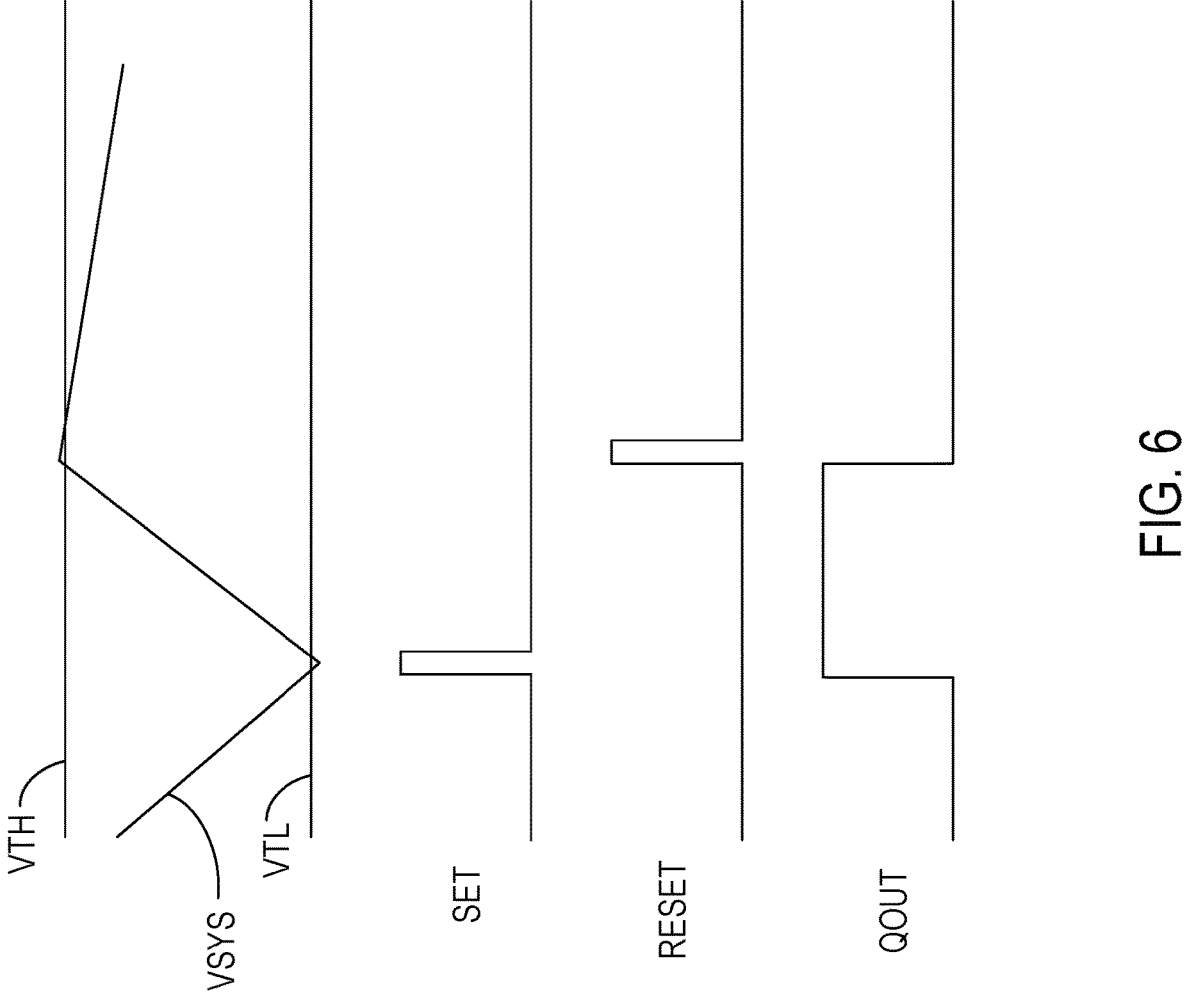
FIG. 6 shows signal waveforms of a switch control circuit in a controller, in accordance with embodiments of the present invention.

If the battery monitoring circuit 304 determines that the battery 160 is in a fully charged state, then the charge indication signal EN is in a first state (e.g., logic low), the switch Q3 is turned off, the second operational amplifier EA2 is disabled, and the signal EN1 received by the AND gate 505 in the switch control circuit 340 is in a second state (logic high). Therefore, the state of the switching signal CTL output by the AND gate 505 is determined by the output of the R-S flip-flop 503. Referring to FIGS. 5 and 6, if the system voltage VSYS decreases below the first threshold VTL, then the first control signal SET output by the second comparator COMP2 is logic high, the second control signal RESET output by the third comparator COMP3 is logic low, and the status signal QOUT output by the R-S flip-flop 503 is logic high. Therefore, the switching signal CTL is also logic high, the switch unit 303 is turned on, the capacitor C2 is charged by the current source S2, the compensation voltage VCOMP increases, and the pulse width modulation signal PWM1 increases accordingly. As a result, the system voltage VSYS supplied to the load 180 by the voltage converter 120 increases. If the system voltage VSYS increases above the second threshold VTH, then the first control signal SET output by the second comparator COMP2 is logic low, the second control signal RESET output by the third comparator COMP3 is logic high, and the status signal QOUT output by the R-S flip-flop 503 is logic low. Therefore, the switching signal CTL is also logic low, the switch unit 303 is turned off, the capacitor C2 stops being charged by the current source S2, and the compensation voltage VCOMP stops increasing. Through the above mechanism, controller 210 can improve the response speed of voltage converter 120. If the battery 160 is fully charged and the current of the load 180 suddenly changes, the system voltage VSYS decreases due to the mode switching of the voltage converter 120. The controller 210 monitors the system voltage VSYS and utilizes the current source S2 to charge the capacitor C2 to quickly increase the compensation voltage VCOMP, so as to pull the system voltage VSYS above the first threshold VTL. Accordingly, the battery 160 will not discharge through the body diode of the switch Q3 due to a low system voltage.

FIG. 7 shows a flowchart of a method for controlling a voltage converter in a power supply circuit by a controller, in accordance with embodiments of the present invention. The voltage converter receives electrical power from an adapter and generates a real-time charging current and a real-time battery voltage to charge a battery, and generates a system voltage to power a load.

In block 701, the controller compares the real-time charging current with a preset charging current to generate a first comparison result.

In block 702, the controller compares the real-time battery voltage with a preset battery voltage to generate a second comparison result.

In block 703, the controller compares the system voltage with a preset reference voltage to generate a third comparison result.

In block 704, the controller generates a compensation voltage based on the first comparison result, the second comparison result and the third comparison result.

In block 705, the controller adjusts the compensation voltage based on a state of charge of the battery and the system voltage. If the battery is in a fully charged state and the system voltage decreases to a first threshold, then the controller increases the compensation voltage. If the battery is in a fully charged state and the system voltage increases to a second threshold, then the controller stops increasing the compensation voltage.

In block 706, the controller generates a first switching signal and a second switching signal based on the compensation voltage to control an upper switch and a lower switch of the voltage converter, respectively.

As described above, the present invention discloses a controller for controlling a voltage converter and a method for controlling a voltage converter. When the system voltage output by the voltage converter decreases due to sudden change of the load current and mode switching of the voltage converter, the controller and method disclosed in the present invention can timely increase the system voltage, thus improving the response speed of the voltage converter and avoiding battery discharge due to low system voltage.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A controller for controlling a voltage converter, said voltage converter receiving electrical power from an adapter, generating a real-time charging current and a real-time battery voltage to charge a battery, and generating a system voltage to power a load, wherein said controller comprises:

a compensation circuit operable for comparing said real-time charging current with a preset charging current to generate a first comparison result, comparing said real-time battery voltage with a preset battery voltage to generate a second comparison result, comparing said system voltage with a preset reference voltage to generate a third comparison result, and generating a compensation voltage based on said first comparison result, said second comparison result, and said third comparison result, wherein said compensation circuit comprises:

a first operational amplifier operable for comparing said real-time charging current with said preset charging current to generate said first comparison result;

a second operational amplifier operable for comparing said real-time battery voltage with said preset battery voltage to generate said second comparison result;

a third operational amplifier operable for comparing said system voltage with said preset reference voltage to generate said third comparison result; and a first current source operable for charging a capacitor, wherein a voltage across said capacitor is said compensation voltage, wherein said compensation voltage is adjusted by said first comparison result, said second comparison result and said third comparison result;

an acceleration circuit operable for adjusting said compensation voltage based on a state of charge of said battery and said system voltage; and a driving circuit operable for generating a first switching signal and a second switching signal based on said compensation voltage to control an upper switch and a lower switch of said voltage converter, respectively.

2. The controller of claim 1, wherein said driving circuit comprises:

a triangular wave generator operable for generating a triangular wave signal;

a first comparator operable for generating a pulse width modulated signal based on said triangular wave signal and said compensation voltage; and a driver operable for generating said first switching signal and said second switching signal based on said pulse width modulation signal.

3. The controller of claim 2, wherein a first input terminal of said first comparator receives said compensation voltage, a second input terminal of said first comparator receives said triangular wave signal, and an output terminal of said first comparator outputs said pulse width modulation signal, wherein said first input terminal of said first comparator, an output terminal of said first operational amplifier, an output terminal of said second operational amplifier, an output terminal of said third operational amplifier, said first current source and said capacitor are connected to a common node.

4. The controller of claim 2, wherein said acceleration circuit comprises:

a battery monitoring circuit operable for generating a charge indication signal indicating said state of charge of said battery based on said real-time battery voltage and said real-time charging current; and an adjustment circuit operable for adjusting said compensation voltage based on said charge indication signal and said system voltage, wherein: if said charge indication signal indicates that said battery is in a fully charged state and said system voltage decreases to a first threshold, said adjustment circuit increases said compensation voltage; if said charge indication signal indicates that said battery is in said fully charged state and said system voltage increases to a second threshold, said adjustment circuit stops increasing said compensation voltage.

5. The controller of claim 4, further comprising:

a threshold generator operable for generating said first threshold and said second threshold based on said real-time battery voltage, wherein said first threshold is less than said second threshold.

6. The controller of claim 4, wherein said adjustment circuit comprises:

a switch unit coupled between a second current source and said capacitor; and a switch control circuit coupled to said switch unit, wherein: if said charge indication signal indicates that said battery is in said fully charged state and said system voltage decreases to said first threshold, said switch control circuit is operable for turning on said switch unit to charge said capacitor by said second current source to increase said compensation voltage; if said system voltage increases to said second threshold, said switch control circuit is operable for turning off said switch unit to stop increasing said compensation voltage.

7. The controller of claim 6, wherein said switch control circuit comprises:

a system voltage monitoring unit operable for generating a first control signal and a second control signal based on said system voltage;

an R-S flip-flop operable for generating a status signal based on said first control signal and said second control signal; and an AND gate operable for generating a switching signal based on said status signal and said charge indication signal to control said switch unit.

8. The controller of claim 7, wherein said system voltage monitoring unit comprises a second comparator and a third comparator, wherein said second comparator is operable for generating said first control signal based on said first threshold and said system voltage, said third comparator is operable for generating said second control signal based on said second threshold and said system voltage, wherein an S input terminal of said R-S flip-flop receives said first control signal, an R input terminal of said R-S flip-flop receives said second control signal, and a Q output terminal of said R-S flip-flop outputs said status signal.

9. A method for controlling a voltage converter, said voltage converter receiving electrical power from an adapter, generating a real-time charging current and a real-time battery voltage to charge a battery, and generating a system voltage to power a load, wherein said method comprises:

comparing said real-time charging current with a preset charging current to generate a first comparison result;

comparing said real-time battery voltage with a preset battery voltage to generate a second comparison result;

comparing said system voltage with a preset reference voltage to generate a third comparison result;

generating a compensation voltage based on said first comparison result, said second comparison result and said third comparison result;

adjusting said compensation voltage based on a state of charge of said battery and said system voltage; and generating a first switching signal and a second switching signal based on said compensation voltage to control an upper switch and a lower switch of said voltage converter, respectively, wherein generating said first switching signal and said second switching signal based on said compensation voltage comprises:

generating a triangular wave signal;

generating a pulse width modulated signal based on said triangular wave signal and said compensation voltage; and generating said first switching signal and said second switching signal based on said pulse width modulation signal.

10. The method of claim 9, wherein said step of generating said compensation voltage based on said first comparison result, said second comparison result and said third comparison result comprises:

charging a capacitor by a first current source, wherein a voltage across said capacitor is said compensation voltage; and adjusting said voltage across said capacitor based on said first comparison result, said second comparison result and said third comparison result.

11. A method for controlling a voltage converter, said voltage converter receiving electrical power from an adapter, generating a real-time charging current and a real-time battery voltage to charge a battery, and generating a system voltage to power a load, wherein said method comprises:

comparing said real-time charging current with a preset charging current to generate a first comparison result;

comparing said real-time battery voltage with a preset battery voltage to generate a second comparison result;

comparing said system voltage with a preset reference voltage to generate a third comparison result;

generating a compensation voltage based on said first comparison result, said second comparison result and said third comparison result;

adjusting said compensation voltage based on a state of charge of said battery and said system voltage, wherein the adjusting said compensation voltage based on said state of charge of said battery and said system voltage comprises:

generating said first threshold and said second threshold based on said real-time battery voltage, wherein said first threshold is less than said second threshold;

increasing said compensation voltage if said charge indication signal indicates that said battery is in a fully charged state and said system voltage decreases to said first threshold; and stop increasing said compensation voltage if said charge indication signal indicates that said battery is in said fully charged state and said system voltage increases to said second threshold; and generating a first switching signal and a second switching signal based on said compensation voltage to control an upper switch and a lower switch of said voltage converter, respectively.

* * * * *